C. LA COUR.
RESILIENT METAL WHEEL RIM.
APPLICATION FILED NOV. 29, 1910.
1,038,903.
Patented Sept. 17, 1912.
2 SHEETS—SHEET 1.
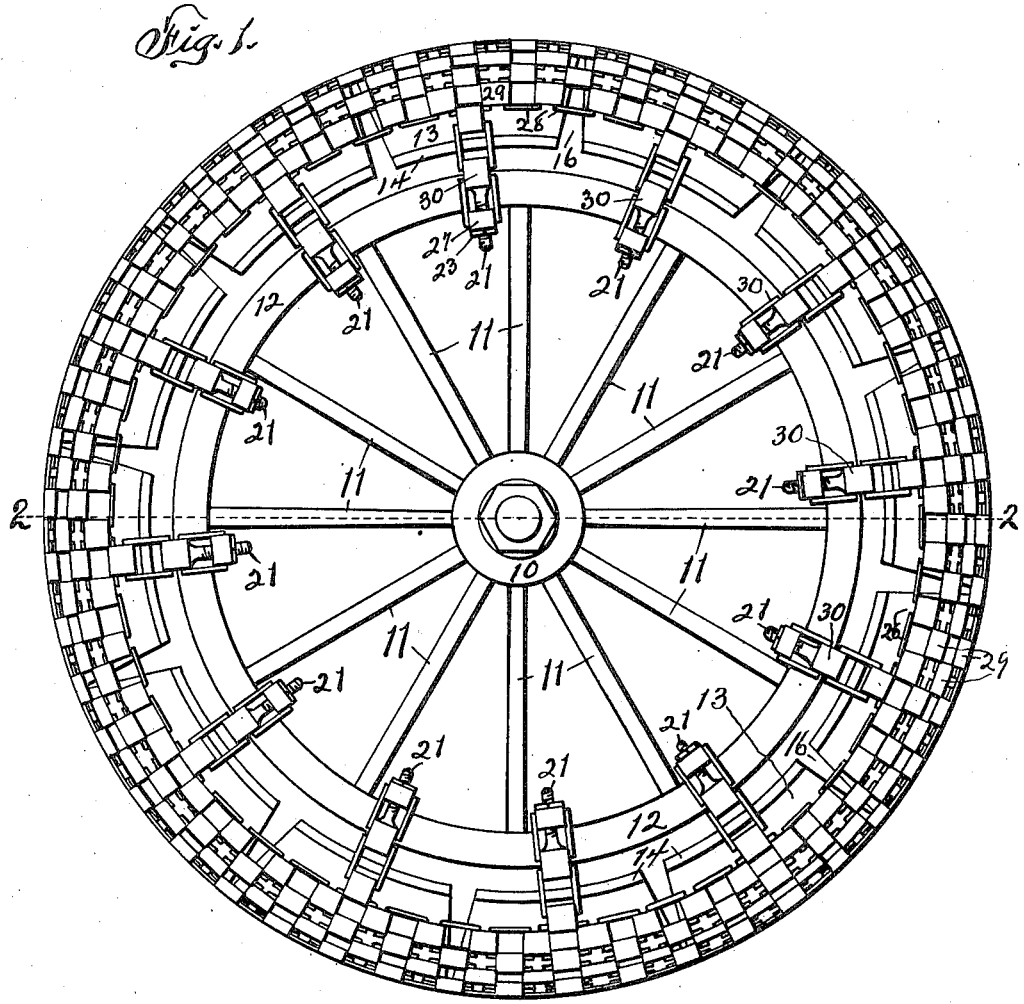
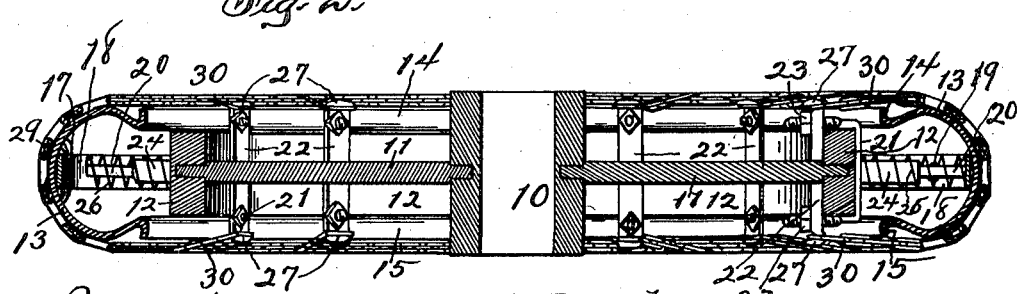
Attest:
F. D. Thompson
Earl M. Sinclair
Inventor:
Carl La Cour.
By Hewett Atty C. LA COUR.
RESILIENT METAL WHEEL RIM.
APPLICATION FILED NOV. 29, 1910.
1,038,903.
Patented Sept. 17, 1912.
2 SHEETS—SHEET 2.
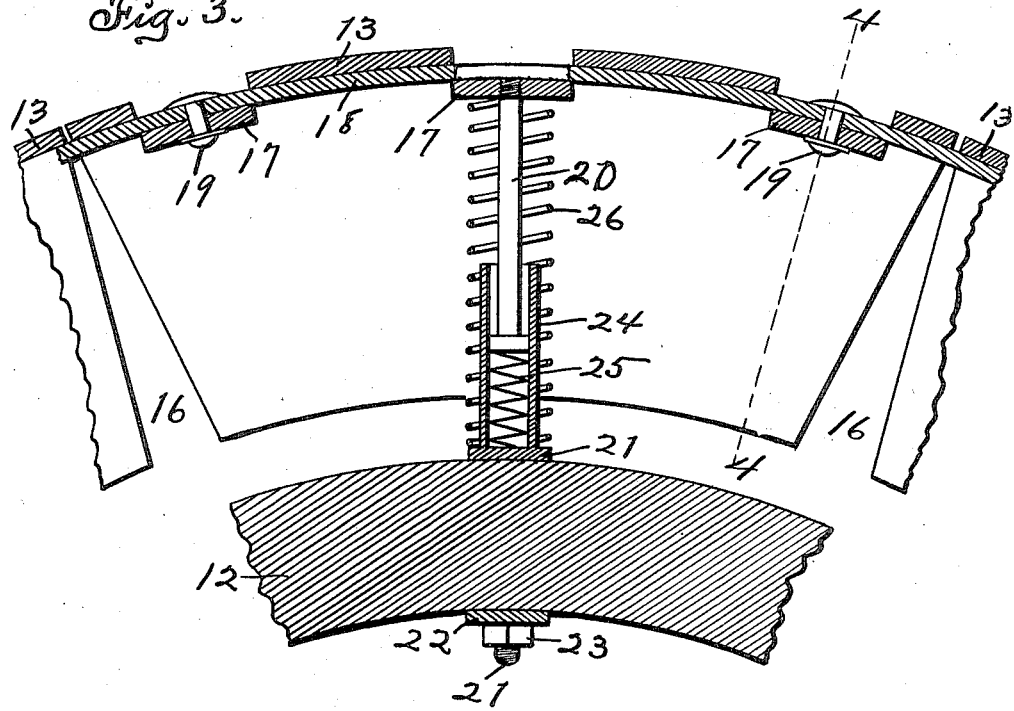
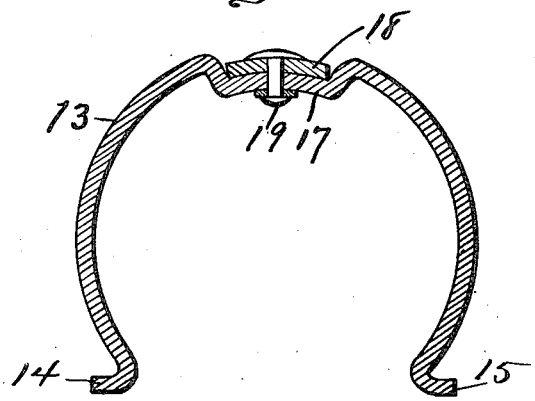
Attest:
Ele W. Miller
Earl M. Sinclair
Inventor:
Carl La Cour,
By J. C. Sweet, Atty

UNITED STATES PATENT OFFICE.

CARL LA COUR, OF HUBBARD, IOWA.

RESILIENT METAL WHEEL-RIM.

1,038,903. Specification of Letters Patent. Patented Sept. 17, 1912.

Application filed November 29, 1910. Serial No. 595,164.

*To all whom it may concern:*

Be it known that I, CARL LA COUR, a citizen of the United States of America, and resident of Hubbard, Hardin county, Iowa, have invented a new and useful Resilient Metal Wheel-Rim, of which the following is a specification.

The object of this invention is to provide an improved construction for wheel rims especially adapted to take the place of pneumatic, rubber or raw-hide tires on motor vehicles.

A further object of this invention is to provide means for holding a resilient sectional wheel rim under uniform tension.

A further object of this invention is to provide a detachable shoe arranged for use with a resilient metal wheel rim formed in sections.

A further object of this invention is to provide improved means for cushioning a metal wheel rim formed in sections.

A further object of this invention is to provide improved means for adjusting the tension of metal wheel rims formed in sections.

My invention consists in the construction, arrangement and combination of elements hereinafter set forth, pointed out in my claims and illustrated by the accompanying drawing, in which—

Figure 1 is an elevation of a complete wheel embodying my improved construction. Fig. 2 is a cross-section on the indicated line 2—2 of Fig. 1. Fig. 3 is an enlarged detail section longitudinally of the rim, illustrating construction hidden in other views. Fig. 4 is a cross-section on the indicated line 4—4 of Fig. 3.

In the construction of the wheel as shown the numeral 10 designates a hub, 11 spokes radiating therefrom and varying in width as desired, and 12 a rim preferably made of wood and arranged concentric with the hub. The metal rim is constructed of like sections 13, preferably corresponding with the number of the spokes 11 and adapted to be arranged so as to overlie the outer ends of the spokes. Each section 13 is concavo-convex in cross-section and is formed with hooked, outwardly extending, marginal flanges 14, 15 which serve to stiffen and strengthen the rim. The end portions of the rim sections 13 are inclined inwardly in such manner that when said sections are assembled V-shaped notches 16 are produced between abutting end portions. The rim sections 13 also are curved throughout their lengths on arcs of the circumference of the completed wheel rim. The rim sections 13 preferably are formed of metal by molding and are constructed with inwardly extending loops 17 spaced from and forming slideways within the inner surfaces of the sections. A resilient ring or band 18, preferably formed of steel, is mounted through the loops 17 and within the slideways formed thereby and has its end portions connected by rivets 19 to one of the rim sections after all of the required number of sections are strung on said ring. One of the rivets 19 is shown at the right end of Fig. 2. Piston bolts 20, corresponding in number with the rim sections and spokes, are screwed into the central portions of the loops 17 and extend inwardly therefrom. U-bolts or yokes 21, corresponding in number with the piston bolts 20, are mounted across and in embracing relations with the rim 12 and the closed ends of said yokes extend across and outside of said rim. Bar washers 22 are mounted on the U-bolts 21 and extend across the inner face of the rim 12 and are secured by nuts 23, on the ends of the U-bolts. Sockets 24, corresponding in number with the piston bolts 20 and U-bolts 21, are mounted on and extend radially from closed ends of said U-bolts and preferably are integral therewith. Expansive coil springs 25 are mounted in the sockets 24 and are adapted to be engaged and compressed by and apply yielding pressure to the heads of the piston bolts 20.

Expansive coil springs 26 are mounted around the sockets 24 and piston bolts 20 and impinge at opposite ends on the U-bolts 21 and loops 17 respectively. It is the function of the piston bolts 20, U-bolts 21, sockets 24 and springs 25, 26 to space the rim sections 13 from the rim 12. End portions of the bar washers 22 are formed as inwardly opening hooks 27. An annular flexible shoe is provided and is constructed of links 28, preferably rectangular in form and having side bars oval in cross-section, and metal loops 29 embracing and pivotally connecting side bars of said links. The links 28 and loops 29 preferably are arranged in checkered relations to each other to form the shoe and are pivotally connected circumferentially and diametrically of the annulus of the shoe. The shoe is of such width as to overlie and embrace the tread surface and the major portion of each side surface of the rim sections 13, but the margins of said shoe preferably terminate on an annulus outside of and concentric with the annuli indicated by the hook flanges 14, 15. Wings or extensions 30, corresponding to double the number of the spokes and formed of links and loops the same as the shoe, extend laterally and inwardly from side margins of the shoe in spaced relations with each other and the terminal links of said wings removably engage the hooks 27 of the bar washers 22. It is the function of the shoe to overlie the rim sections 13 and provide a traction surface therefor. It is the function of the wings 30 to connect the shoe to the bar washers 22 in such manner that the shoe will apply uniform pressure to the tread surface of the metal rim sections. The wings 30, in conjunction with the U-bolts, bar washers and nuts 23, provide means for adjusting the tension with which the shoe holds the rim sections in aggregated relations.

I do not desire to be understood as limiting myself to the precise construction and arrangement of parts as shown since such can be modified in many particulars without departing from the spirit of my invention.

I claim as my invention—

1. The combination of an inflexible rim and a resilient metal wheel rim composed of a plurality of abutting metal sections, means for connecting said sections in series, yokes mounted on the inflexible rim, sockets on said yokes, piston bolts entering said sockets and fixed to said sections, and springs between said piston bolts and yokes.

2. A resilient metal wheel rim composed of a plurality of abutting metal sections, each section concavo-convex in cross-section and curved longitudinally on an arc of the circumference of the rim, each section formed with an inwardly extending loop, a strap extending through successive loops of the sections and secured at its ends to one section, in combination with an inflexible rim and yielding supports between said sections and inflexible rim.

Signed by me at Hubbard, Iowa, this fourth day of November, 1910.

CARL LA COUR.

Witnesses:
J. J. HARMAN,
J. F. JONES.